Patented Nov. 29, 1932

1,889,672

UNITED STATES PATENT OFFICE

ALFRED T. LARSON, OF WILMINGTON, DELAWARE, ASSIGNOR, BY MESNE ASSIGNMENTS, TO E. I. DU PONT DE NEMOURS & COMPANY, OF WILMINGTON, DELAWARE, A CORPORATION OF DELAWARE

MANUFACTURE OF HYDROGEN

No Drawing.   Application filed May 15, 1928. Serial No. 278,043.

This invention relates to the production of hydrogen from steam and carbon monoxide.

Hydrogen may be prepared by the catalytic reaction of steam with carbon monoxide according to the equation:

$$CO + H_2O = H_2 + CO_2.$$

In practical operation the volume ratio of steam to hydrogen is preferably at least 1.5:1. This process has found considerable commercial application in the manufacture of hydrogen from gaseous fuels such as water-gas, coal gas, coke oven gas, etc.

It is the object of the present invention to provide an improved process for manufacturing hydrogen in accordance with the foregoing reaction, the invention involving the use of catalysts of superior activity, capable of greatly accelerating the reaction and increasing the efficiency of the process.

Other objects and advantages of the invention will be apparent as it is better understood by reference to the following specification in which its details and preferred embodiments are described.

I have discovered that improved results may be obtained in the manufacture of hydrogen by causing steam and carbon monoxide, mixed preferably in a volume ratio of at least 1½ : 1, to react at a temperature sufficiently elevated to effect the reaction:

$$H_2O + CO = H_2 + CO_2$$

in the presence of a catalyst containing copper and one or more of certain irreducible metallic oxides belonging to the second to the sixth groups of the periodic system. Catalysts of this character are unusually active, permit the initiation of the reaction at lower temperatures than is possible with previously known catalysts, on account of their high activity reduce the amount of heat exchange required between incoming and outgoing gases, generally increase the efficiency of the manufacturing operation and thus materially contribute to reducing the costs of the hydrogen produced.

As examples of oxides that are suitable for incorporation with copper in the catalytic bodies contemplated by the invention I mention the oxides of the elements, tungsten, chromium, molybdenum, cerium, vanadium, manganese, uranium and magnesium. The catalysts may be prepared by various methods suitable for the manufacture of catalytic materials. Thus an intimate mixture of copper oxide and one or more irreducible oxides to be incorporated therewith may be prepared by triturating, co-precipitating or fusing a mixture of the oxides. The product may then be formed into tablets or granules of suitable size and shape and, if desired, submitted preliminarily to reduction to convert the copper oxide to metal before the catalyst is used; or alternatively the reduction of the copper oxide contained in the catalyst may be carried out in situ by the reaction mixture of steam and carbon monoxide. Similarly suitable mixtures of the catalytic elements may be prepared by ignition of mixtures of salts thereof, by preparing chemical compounds with copper and one or more of the irreducible oxides, and by other methods adapted for the preparation of a body of material containing copper in relatively intimate association with one or more of the aforementioned irreducible oxides of the second to the sixth periodic groups.

As illustrative of the relative proportions and methods of preparing the catalysts described, the following examples are given:

*Example 1.*—Melt cupric oxide containing an admixture of 5% chromium oxide, allow to cool, and crush to suitable size.

*Example 2.*—Ignite a mixture comprising equal moles of copper nitrate and manganese nitrate. When the nitrate has been decomposed allow the mass to cool and crush to suitable size.

*Example 3.*—Prepare a dilute solution, about 10%, comprising equal moles of copper nitrate and magnesium nitrate. Slowly add to this solution dilute ammonia, about 10%, until the characteristic blue cupric ammonium compound begins to form. Allow the precipitate to settle, wash by decantation, dry, and form into pellets.

*Example 4.*—To a dilute solution containing approximately equimolecular proportions of the nitrates of copper, manganese, and chromium, add dilute ammonia (approximately 10%) until the metals have been completely precipitated as hydroxides. Wash the precipitate repeatedly by decantation until the wash water is practically free from ammonium nitrate. Remove the major portion of the water by filtration, dry the precipitate in an oven at about 100° C., and break the dried product into fragments of suitable size.

*Example 5.*—To a dilute solution containing one mole of copper sulfate and two moles of manganese sulfate add a solution containing three moles of ammonium chromate. Add some ammonia to complete the precipitation. Wash the precipitate until practically free from ammonium sulfate, filter the copper-manganese-chromate mixture, dry the filter cake at approximately 100° C. and crush it into particles of suitable size.

In each of the foregoing examples the catalyst before use is preferably subjected to reduction with hydrogen at a temperature within the range of 100–300° C.; however, the reduction may be effected in situ by means of the reaction mixture of steam and carbon monoxide. In manufacturing hydrogen the catalyst chosen for the purpose is disposed in a suitable reaction apparatus through which there is passed a mixture of steam and carbon monoxide, preferably in the volume ratio of at least 1.5:1, and preliminarily freed from sulfur compounds and other substances deleterious to the catalyst. The carbon monoxide used is preferably a commercial gas containing large concentrations of carbon monoxide, e. g. upward of 20% by volume. The reaction may be carried out at atmospheric pressure, but pressures of from about 10 to 100 atmospheres are preferred. The temperature employed will depend upon the catalyst, the composition of the raw materials and the desired composition of the reaction products. It must be sufficient to effect the desired reaction. Temperatures above 300° C. and upward to 600° C. or higher give satisfactory conversion.

I have no explanation or theory to offer to changes that may occur in the catalysts herein described, either during their preparation or actual use. It is well known that while materials of known form and competition may initially be introduced into the reaction apparatus as catalyst, the exact chemical state in which they exist during reaction cannot be ascertained. Consequently in the claims the term copper is used to designate that element in either free or chemically combined state; and the term oxide as applied to the elements associated with copper includes the oxide as such or in combination with one or more other elements.

The process herein described may be applied to the production of hydrogen from carbon monoxide gases obtained from a variety of sources, and is particularly useful when applied to gases containing high concentrations of carbon monoxide, e. g. upwards of 20% by volume of carbon monoxide, as for example gases obtained by the direct oxidation of carbonaceous fuel or as a by-product from such processes as the manufacture of metals or metallic carbides from metallic oxides and coke.

Various changes may be made in the method herein described without departing from the invention or sacrificing any of the advantages thereof.

I claim:

1. The process of producing hydrogen which comprises submitting steam and carbon monoxide to the action of a catalyst at a temperature sufficiently elevated to effect the reaction $$H_2O + CO = H_2 + CO_2,$$

said catalyst containing copper and an oxide of an element selected from the group consisting of tungsten, molybdenum, cerium, vanadium, manganese, and magnesium.

2. The process of producing hydrogen which comprises submitting steam and carbon monoxide, in a volume ratio of at least 1.5:1, to the action of a catalyst at a temperature sufficiently elevated to effect the reaction $$H_2O + CO = H_2 + CO_2,$$

said catalyst containing copper and an oxide of an element selected from the group consisting of tungsten, molybdenum, cerium, vanadium, manganese, and magnesium.

3. The process of producing hydrogen which comprises submitting steam and carbon monoxide to the action of a catalyst at a temperature exceeding about 300° C., said catalyst containing copper and an oxide of an element selected from the group consisting of tungsten, molybdenum, cerium, vanadium, manganese, and magnesium.

4. The process of producing hydrogen which comprises mixing steam with a gaseous mixture containing upward of 20% of carbon monoxide and causing the steam and carbon monoxide in the resultant mixture to react according to the reaction $$H_2O + CO = H_2 + CO_2$$

in the presence of a catalyst containing copper and an oxide of an element selected from the group consisting of tungsten, molybdenum, cerium, vanadium, manganese, and magnesium.

5. The process of producing hydrogen which comprises submitting steam and carbon monoxide, to the action of a catalyst at a temperature sufficiently elevated to effect the reaction $$H_2O + CO = H_2 + CO_2,$$

said catalyst containing copper and manganese oxide.

6. The process of producing hydrogen which comprises submitting steam and carbon monoxide in a volume ratio of at least 1.5:1, to the action of a catalyst at a temperature sufficiently elevated to effect the reaction $$H_2O + CO = H_2 + CO_2,$$

said catalyst containing copper and manganese oxide.

7. The process of producing hydrogen which comprises submitting steam and carbon monoxide to the action of a catalyst at a temperature exceeding about 300° C., said catalyst containing copper and manganese oxide.

8. The process of producing hydrogen which comprises mixing steam with a gaseous mixture containing upward of 20% of carbon monoxide and causing the steam and carbon monoxide in the resultant mixture to react according to the reaction $$H_2O + CO = H_2 + CO_2,$$

in the presence of a catalyst containing copper and manganese oxide.

9. The process of producing hydrogen which comprises submitting steam and carbon monoxide to the action of a catalyst at a temperature sufficiently elevated to effect the reaction $$H_2O + CO = H_2 + CO_2,$$

said catalyst containing copper, manganese oxide and chromium oxide.

10. The process of producing hydrogen which comprises submitting steam and carbon monoxide, in a volume ratio of at least 1.5:1, to the action of a catalyst at a temperature sufficiently elevated to effect the reaction $$H_2O + CO = H_2 + CO_2,$$

said catalyst containing copper, manganese oxide and chromium oxide.

11. The process of producing hydrogen which comprises submitting steam and carbon monoxide to the action of a catalyst at a temperature exceeding about 300° C., said catalyst containing copper, manganese oxide and chromium oxide.

12. The process of producing hydrogen which comprises mixing steam with a gaseous mixture containing upward of 20% of carbon monoxide and causing the steam and carbon monoxide in the resultant mixture to react according to the reaction $$H_2O + CO = H_2 + CO_2$$

in the presence of a catalyst consisting of copper, manganese oxide and chromium oxide.

In testimony whereof, I affix my signature.

ALFRED T. LARSON.